Figure 1:
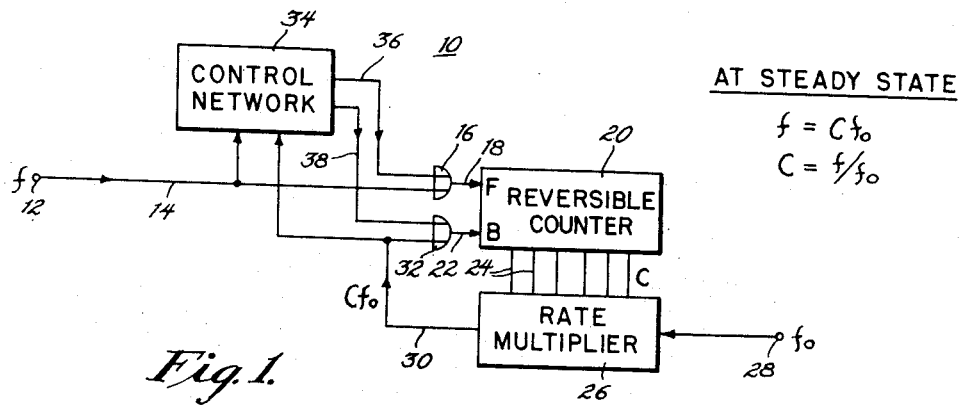

Aug. 30, 1960

B. M. GORDON 2,951,202

FREQUENCY METER APPARATUS

Filed Nov. 2, 1956

2 Sheets-Sheet 1

AT STEADY STATE $f = Cf_0$
$C = f/f_0$

INVENTOR.
BERNARD M. GORDON
BY
Trachtman + Zoda
ATTORNEYS.

Aug. 30, 1960

B. M. GORDON 2,951,202

FREQUENCY METER APPARATUS

Filed Nov. 2, 1956

2 Sheets-Sheet 2

INVENTOR.
BERNARD M. GORDON
BY
Trachtman & Toda
ATTORNEYS

United States Patent Office 2,951,202
Patented Aug. 30, 1960

2,951,202

FREQUENCY METER APPARATUS

Bernard M. Gordon, Newton, Mass., assignor to Epsco, Incorporated, Boston, Mass., a corporation of Massachusetts Filed Nov. 2, 1956, Ser. No. 620,087

18 Claims. (Cl. 324—79)

The invention relates to a counting device and more particularly a frequency meter apparatus of the closed loop servo-type provided with means for accelerating its operation.

This is a continuation in part of application for U.S. Letters Patent, application Serial No. 542,875, filed by me on October 26, 1955, and entitled "Frequency Meter."

The invention provides a counting apparatus, and more particularly a frequency meter of the servo-type delivering an output signal in binary form with a value proportioned to the rate of sequentially received signals delivered to the apparatus and embodying means for accelerating its operation.

Heretofore, signal responsive counting and frequency measuring devices of the servo-type have been provided which have responded exponentially to changes in the frequency being measured. The normal exponential response of such devices to changes of input frequency to be measured have limited their frequency response and accuracy with which changes in frequency can be followed.

It is therefore a primary object of the invention to provide a new and improved signal counting or frequency meter apparatus of the servo-type having means increasing its frequency response and accuracy with which changes in frequency of the signal being measured is followed.

Another object of the invention is to provide a new and improved frequency meter apparatus which is simple and inexpensive in operation and construction.

Another object of the invention is to provide a new and improved frequency meter apparatus which continuously delivers an output signal reflecting the frequency of input signals.

Another object of the invention is to provide a new and improved frequency meter apparatus which does not require special conversion apparatus for delivering its information signal in binary form.

Another object of the invention is to provide a new and improved frequency meter which can follow and measure the frequency of the input signal with increased accuracy while its frequency is changing.

Another object of the invention is to provide a new and improved frequency meter which may be adapted to arrive at and deliver an output information signal having the accuracy required with a minimum of delay.

Another object of the invention is to provide a new and improved frequency meter which may readily be adapted for measuring high and low frequency signals.

Another object of the invention is to provide a new and improved frequency meter which may be readily adapted for various design and system requirements.

The above object as well as many other objects of the invention will be apparent from the description of the invention when read in conjunction with the drawings, in which:

Figure 1 is a block diagram illustrating an embodiment of the invention, and

Figure 2:
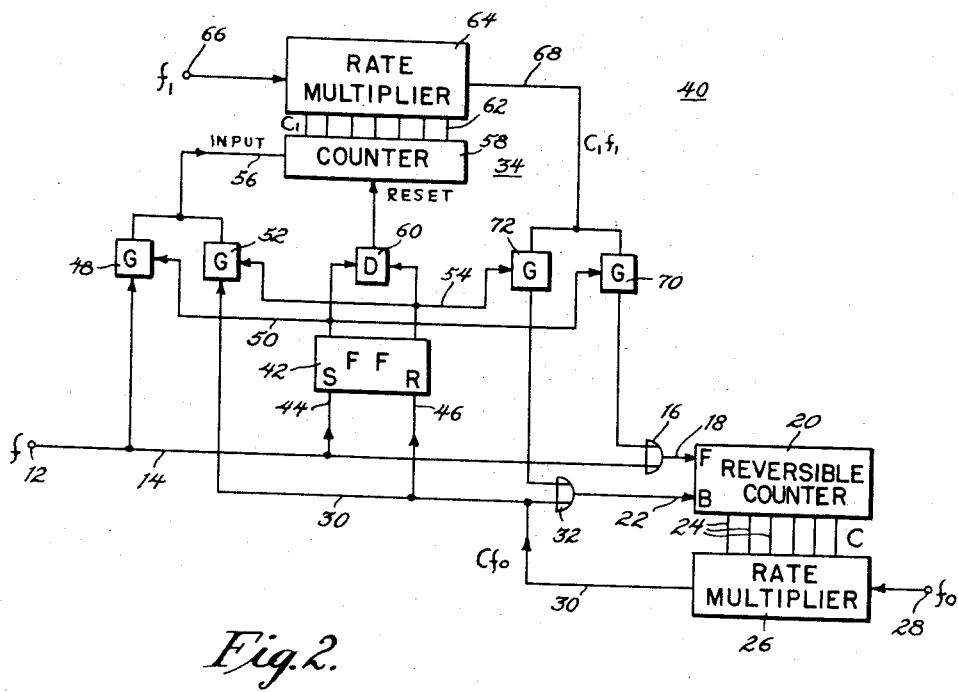
Figure 3:
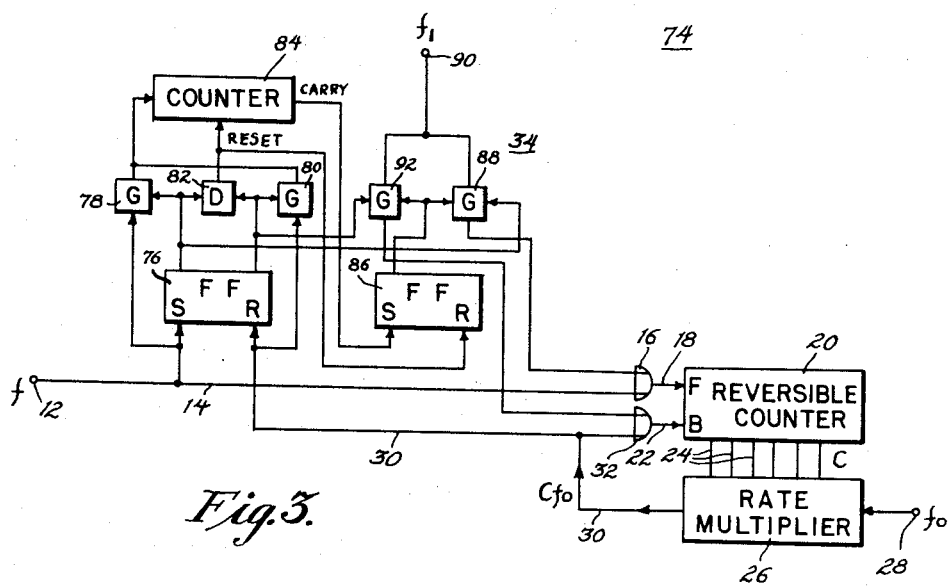
Figure 4:
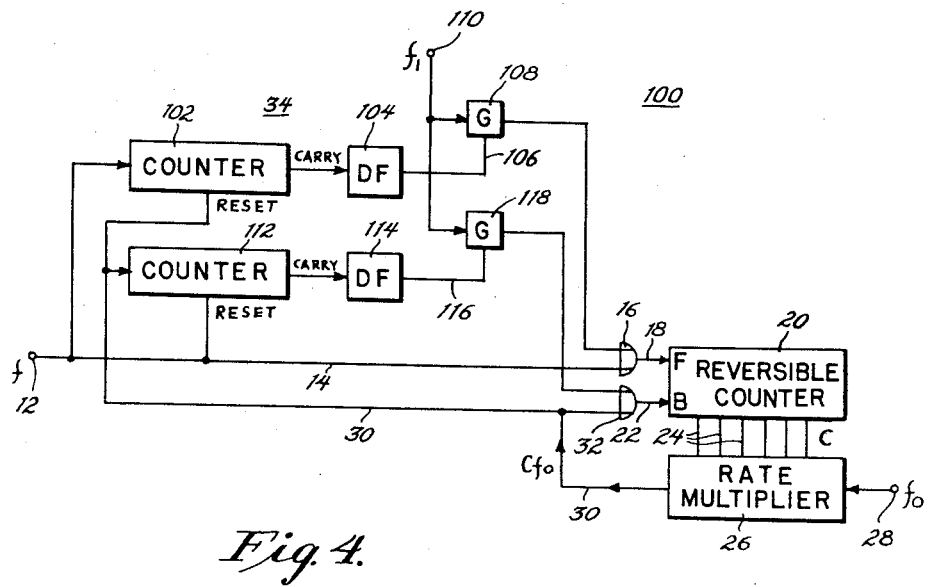

Figures 2, 3 and 4 each illustrate in block form and in greater detail a modified embodiment of the invention shown in Figure 1.

Like reference numerals designate like parts throughout the several views.

Refer to Figure 1 which is a block diagram illustrating a signal counting frequency meter apparatus 10 embodying the invention. The apparatus 10 has an input terminal 12 adapted for receiving signals having a pulse rate or frequency $f$ which is to be measured. The signals on the input terminal 12 are delivered over a line 14 and through a buffer 16 to the forward count input terminal 18 of a reversible counter 20. The reversible counter 20 has a backward count input lead 22, and a plurality of output leads 24.

The output leads 24 of the reversible counter 20 deliver in binary form the count signal C of the reversible counter 20 to the rate control input terminals of a rate multiplier 26.

The rate multiplier 26 which is illustrated is of the binary type and receives activating signals having a predetermined frequency $f_0$ from an input terminal 28. The output line 30 of the binary rate multiplier delivers sequential pulse signals with a product rate or frequency $Cf_0$ responsive to the count C of the reversible counter 20. The output signals on the line 30 from the rate multiplier 26 are delivered through the buffer 32 to the backward count lead 22 of the reversible counter 20.

When the counting apparatus 10 is in its steady state condition, the frequency of signals received by the forward count input line 18 of the reversible counter 20 is equal to the frequency of signals received by the backward count input lead 22. This may be expressed as follows:

$$f = Cf_0$$

or $$C = f/f_0$$

A control network 34 is excited by forward count input signals from the input line 14 and backward count input signals from the line 30. The control network 34 has an output line 36 for delivering forward count signals through the buffer 16 to the input lead 18 of the reversible counter 20, and an output line 38 for delivering backward count input signals through the buffer 32 to the backward count input lead 22 of the reversible counter 20.

The control network 34 selectively delivers forward and backward count signals over its lines 36 and 38 when the counting apparatus is not in its steady state condition. The output signals from the control network 34 tend to accelerate the action of the apparatus 10 in assuming its steady state condition.

For example, if the rate of signals delivered over the line 14 to the forward count input lead 18 of the reversible counter 20 exceeds the rate of signals delivered by the line 30 to the backward count input lead 22 of the counter 20, the control network 34 delivers output signals over its line 36 to the forward input lead 18 of the reversible counter 20. This tends to accelerate the increase in the count C of the counter 20, thereby more rapidly increasing the rate $(Cf_0)$ of signals delivered over the line 30 to the backward count lead of the counter 20.

Similarly, if the rate $(Cf_0)$ of signals delivered to the backward count lead 22 of the reversible counter from the lead 30 of the rate multiplier 26 exceeds the rate of signals delivered by line 14 to the forward count input lead 18 of the counter 20, the control network 34 delivers backward count signals over its output line 38 to the backward count lead 22 of the reversible counter 20.

This increases the rate at which the count C of the counter 20 is reduced, thereby more rapidly decreasing the rate ($Cf_0$) of signals delivered over the line 30 to the backward count input lead 22 of the counter 20. This causes the apparatus 10 to assume its steady state condition at an accelerated rate, thereby increasing the speed and accuracy with which the count C delivered over the lines 24 of the reversible counter 20 follows and corresponds with the frequency $f$ of signals delivered to the input terminal 12.

In operation of the apparatus 10, a signal having a frequency $f$ which is to be measured is delivered to the input terminal 12. These signals are delivered to the forward count lead 18 of the reversible counter. The count C of the counter 20 determines the rate ($Cf_0$) of signals delivered by the output line 30 to the backward count lead 22 of the reversible counter 20. If the signals delivered to the input line 18 have a rate greater than the signals delivered to the backward count line 22 of the reversible counter 20, the count C of the counter 20 increases. Likewise, if the count on the backward count input line 22 has a rate greater than the count of the signals delivered on the forward count input line 18 of the reversible counter 20, the count C of the reversible counter 20 decreases.

The count C of the reversible counter 20 increases or decreases in this manner until the rate of signals delivered to the forward input lead 18 is equal to the rate of signals delivered to the backward input line 22 of the counter 20. At this time the apparatus 10 is in its steady state condition. Under these circumstances, the count C delivered over the output lines 24 of the reversible counter 20 is equal to the ratio of the frequency $f$ to the frequency $f_0$, or, in other words, directly related to the frequency $f$ of the input signal.

When the frequency $f$ changes so that it no longer corresponds to the count C of the reversible counter 20, the rates of signals delivered to the input leads 18 and 20 are no longer in a balanced relationship and the count C of the reversible counter 20 correspondingly increases or decreases to place the apparatus 10 in its equilibrium condition. The apparatus 10 has an exponential response to the difference in the rates of the forward and backward count input signals delivered to the reversible counter 20, the change in the count C of the counter 20 decreasing as the apparatus 10 approaches its equilibrium or steady state condition. The control network 34 accelerates the response of the apparatus by increasing the difference in the rates of signals delivered to the input leads 18 and 22 of the reversible counter 20 during the transient response of the apparatus 20.

Thus, if the rate of signals delivered to the input terminal 18 from the line 14 exceeds the rate of signals delivered to the counter from the line 30 of the rate multiplier 26, the network 34 delivers additional forward count signals to the counter 20, while delivering backward count signals to the counter 20 during the reverse situation.

Thus the control network 34 by its operation accelerates the action of the apparatus 10 in assuming its steady state condition by affecting the exponential response of the apparatus 10.

Refer now to Figure 2 which shows in greater detail a frequency meter apparatus or counting apparatus 40 conforming to the block diagram of Figure 1.

The apparatus 40 receives at its input terminal 12 a signal having a frequency or pulse rate $f$ which is to be determined.

The control network 34 of the apparatus 40 includes a flip-flop circuit 42 having a set lead 44 receiving signals from the input line 14, and a reset line 46 receiving signals from the output line 30 of the rate multiplier 26. The flip-flop circuit 42 delivers an output signal on its line 50 when it is in its set condition, and delivers an output signal to the line 54 when it is in its reset state.

A forward control gate 48 receives signals from the input line 14 and is conditioned for passage of signals by an output signal on line 50 from the flip-flop circuit 42.

A backward control gate 52 receives signals from the output line 30 of the rate multiplier 26 and is conditioned for passing these signals by an output signal on line 54 from the flip-flop circuit 42.

Output signals from the forward and backward control gates 48 and 52 are delivered to the input 56 of a binary counter 58. Output signals from the flip-flop 42 to the lines 50 and 54 are delivered through a differentiator 60 to reset the counter 58.

The counter 58 delivers its output count signal $C_1$ in binary form over a plurality of lines 62 to the rate control leads of a rate multiplier 64.

The rate multiplier 64 receives actuating signals having a predetermined frequency $f_1$ from an input terminal 66 and delivers sequential output signals or pulses to its line 68 having a rate $C_1f_1$ which is the product of the count $C_1$ of the counter 58 and the frequency $f_1$ of the signals delivered to the terminal 66.

A forward output gate 70 is conditioned for passing the signals on line 68 when the flip-flop circuit 42 is in its set condition, while a backward output gate 72 is conditioned for passing output signals on the line 68 when the flip-flop circuit 42 is in its reset condition. Signals from the forward output gate 70 are delivered through the buffer 16 to the forward count input lead 18 of the reversible counter 20. Signals passed by the backward output gate 72 are delivered through the buffer 32 to the backward count input lead 22 of the reversible counter 20.

In general, the apparatus 40 operates in the manner described for the apparatus 10 of Figure 1. The particular operation of the control network 34 of the apparatus 40 for accelerating its operation and increasing the accuracy of response during the transient operation of the device will now be explained in detail.

When the apparatus 40 is in its steady state condition, the rate of signals delivered by the line 14 is equal to the rate of signals delivered by the output line 30 of the rate multiplier 26. Under these circumstances, the flip-flop circuit 42 will first be placed in its set condition with the occurrence of a signal or pulse on line 14 and then will be reset by a signal occurring on the line 30. When the flip-flop circuit 42 is placed in its set condition, it delivers an output signal to the differentiator 60 which resets the counter 58 to its zero count. Likewise, when the flip-flop circuit 42 is reset by the occurrence of a signal on the line 30, a similar output signal delivered to the output line 54 of the flip-flop circuit 42 assures the reset of the counter 58. The counter 58 is thus maintained at its zero count and prevents the delivery of output signals to the line 68 from the rate multiplier 64. In the absence of signals on line 68, the output gates 70 and 72 are ineffective in delivering signals to the inputs of the reversible counter 20. Thus, the control network 34 does not affect the apparatus 40 when it is in its steady state condition.

Assume an unbalanced or transient condition of the apparatus 40, in which the rate of signals delivered to the input terminal 12 exceeds the rate of signals delivered by the output line 30 of the rate multiplier 26, for the purposes of the following exposition. With the flip-flop circuit 42 in its reset condition, the forward input gate 48 is inhibited, and a signal occurring on the input line 14 is not passed to the input lead 56 of the counter 58. The signal on the input line 14, however, places the flip-flop 42 in its set condition so that subsequent signals occurring on this line 14 before the occurrence of a signal resetting the flip-flop 42 are passed through the forward input gate 48 to the counter 58. With the rate of signals on the input line 14 exceeding the rate of signals on the line 30, signals will be passed through the forward input gate 48 to increase the count of the counter 58, thereby increasing the rate ($C_1f_1$) of the product signal on the output line 68 of the rate multiplier 64 before the flip-flop circuit 42 is reset. The signals on the output line 68 are delivered through the forward output gate 70 which is conditioned for delivering them to the forward input lead of the reversible counter 20. It is noted that the larger the difference in the rates of signals delivered to the input line 14 and the line 30, the greater will be the count achieved by the counter 48 before the flip-flop circuit 42 is placed in its reset condition and the counter 58 is reset to its zero count.

This action of delivering signals to the counter 20 by the control network 34 during the set period of the flip-flop circuit 42 is repeated until the steady state condition is achieved. As the difference in the rates of signals on lines 14 and 30 decreases, the count achieved by the counter 28 before it is reset likewise diminishes. Thus, as the apparatus 40 approaches its equilibrium condition, the time during which signals are delivered to the reversible counter 20 from the line 68 during a set state of the flip-flop circuit 42 also decreases as well as the maximum rate of signals which are delivered over the line 68. By this action, the control network 34 delivers on the average a greater number of impulses per unit time when the unbalanced condition is high, while decreasing its activity as the equilibrium condition is approached. This prevents over-shooting and oscillation about the equilibrium condition of the counter 20, while maximizing the speed with which the apparatus 40 is caused to assume its steady state condition.

In a similar manner, when the rate of signals delivered to the input terminal 12 decreases so that it is exceeded by the rate of signals on the line 30, the control network 34 will react as follows:

With the flip-flop 42 in its set condition, the backward input gate 52 is inhibited, preventing the passage to the counter 58 of a signal occurring on line 30. The signal on line 30, however, will cause the flip-flop circuit 42 to assume its reset condition. Upon its resetting, the flip-flop circuit 42 delivers an output signal to the line 54 conditioning the backward input and output gates 52 and 57 for passage of signals. The counter 58 is also reset to its zero count condition.

The subsequent occurrence of signals on the line 30 before the occurrence of a signal on the line 14 is passed through the backward input gate 62 to the counter 58 increasing its count. This results in the delivery of product signals over the line 60 of the rate multiplier 64 which are passed through the backward output gate 72 to the backward count input lead 22 of the reversible counter 20.

The additional signals thus delivered to the counter 20 tend to accelerate the action of the reversible counter 20 in reducing its count C so that the apparatus 40 achieves its equilibruim condition more quickly.

The occurrence of a signal on the input line 14 places the flip-flop circuit 42 in its set condition resetting the counter 58 to its zero state and inhibiting the backward gates 52 and 70.

This process will again be repeated with the occurrence of the next subsequent signals on the line 30 which exceed two in number before the delivery of a signal to the line 14. Of course, as the unbalanced condition is reduced, the number of signals occurring on the line 30 before the occurrence of a signal on the line 14 decreases. This results in the decreased action of the control network 34 and the delivery of fewer additional signals to the reversible counter 20 from the control network 34, until the network 34 delivers no signals to the reversible counter 20 when the steady state condition is assumed by the apparatus 40.

Thus, the control network 34 functions at all times to accelerate the action of the apparatus 40 in assuming its steady state condition with its activity regulated by the degree of unbalance present in the apparatus. The control network 40 operates over the entire range of unbalance for maximumizing the speed at which the apparatus 40 assumes its steady state condition and follows changes or variations in the frequency $f$ of the signal being delivered to the input terminal 12 for measurement.

It is noted that during the equilibrium condition, the flip-flop circuit 42 is alternately placed in its set and reset condition by the occurrence of signals on the lines 14 and 30. Since these signals which set and reset the flip-flop circuit 42 are not passed by the input gates 48 and 52, but only subsequently occurring signals which do not trigger the flip-flop circuit 42, the count C of the counter 58 remains at its zero count and no signals are passed to the output line 68 of the rate multiplier.

When an unbalanced condition exists, and the flip-flop circuit 42 is set or reset, these signals likewise are not passed to the counter 58. This action also provides time for the counter 58 to be reset to its zero count before subsequent signals are delivered to a counter 58 for its counting operation.

Refer now to Figure 3 for a description of a frequency meter or counting apparatus 74 illustrating a modified form of control network 34. The apparatus 74 operates generally as described in connection with Figure 1, and will be described specifically with regard to its control network 34.

The control network 34 of the apparatus 74 comprises a flip-flop circuit 76 which is set by the occurrence of a signal on the line 14 and reset by the occurrence of a signal on the line 30. Upon being set, the flip-flop circuit 76 delivers an output signal conditioning a forward control gate 78 for passage of signals on the line 14, while in its reset condition it delivers an output signal which conditions a backward input gate 80 for passing signals from the line 30. Upon being either set or reset, the flip-flop circuit 76 delivers its output signal to a differentiator 82 which resets to its zero count a control counter 84.

The counter 84, which may be of the binary type, receives at its count input, signals passed by the forward and backward gates 78 and 80. The counter 84 delivers a carry output signal upon reaching a predetermined count. The carry output signal from the counter 84 sets an output control flip-flop 86. The flip-flop 86 is reset by signals from the differentiator 82.

A forward output gate 88 receives signals having a predetermined frequency $f_1$ from an input terminal 90. The forward output gate 88 is conditioned to pass the signals from the terminal 90 when the flip-flop circuits 76 and 86 are both in their set states. The signals from the forward output gate 88 are delivered through the buffer 16 to the forward count input lead 18 of the counter 20.

A backward output gate 92 is also energized by signals from the terminal 90. The gate 92 is conditioned to pass signals only when the flip-flop 76 is in its reset condition and the flip-flop 86 is in its set condition. The signals passed by the gate 92 are delivered through the buffer 32 to the backward count input lead 22 of the reversible counter 20.

In the operation of the control network 34 of the apparatus 74, when the flip-flop circuit 76 is in its reset state, the occurrence of a signal on the line 14 will not be passed by the gate 78 since it is inhibited. The signal on line 14, however, will place the flip-flop 76 in its set state to deliver an output signal conditioning the gate 78 for passage of signals while resetting the counter 84 to its zero state and placing the output flip-flop 86 in its reset condition. The subsequent signals occurring on line 14 before the occurrence of a signal on line 30 will be passed through the forward input gate 78 to the counter 84. When the counter 84 has reached a predetermined count, it will pass a carry signal to the flip-flop 86 placing it in its set condition.

With the flip-flops 76 and 86 both in their set states, the output gate 88 is conditioned to pass signals having a frequency $f_1$ to the forward count input lead 18 of the reversible counter 20.

The output gate 88 continues to deliver these signals to the reversible counter 20, thereby accelerating the rate of increase of its count C, until a signal occurs upon the line 30.

Upon the occurrence of a signal on the line 30, the flip-flop circuit 76 is reset. The setting of the flip-flop 76 causes the differentiator 82 to deliver a signal which resets the counter 84 to its zero count and places the output flip-flop 86 in its reset condition. Since the flip-flop circuits 76 and 78 are now in their reset states, the forward output gate 88 is inhibited from delivering signals to the forward count input lead 18 of the reversible counter 20.

By appropriately selecting the count of the counter 84 at which a carry signal will be delivered, the control network 34 may be adjusted to deliver signals to the reversible counter 20 only when the unbalance of the apparatus 74 exceeds a predetermined minimum value.

When the unbalance of the system is such that the rate of signals on the line 14 is lower than the rate of signals on line 30, the control network 34 operates in a similar manner to that described above. Under such circumstances, a signal occurring on the line 30 is not passed by the backward input gate 80 when the flip-flop circuit 76 is in its set condition. When the flip-flop is triggered to its reset condition, it delivers an output signal which resets the counter 84 to its zero count while assuring that the flip-flop 86 is in its reset condition.

With the flip-flop circuit 76 in its reset state, the backward input gate 80 is conditioned to pass signals subsequently occurring on the line 30 before the occurrence of a signal on the line 14. The signals passed by the gate 80 are delivered to the counter 84 which counts forward and delivers a carry signal only after receiving the predetermined number of input signals.

With the delivery of the carry signal by the counter 84, the output control flip-flop 86 is placed in its set state conditioning the backward output gate 92 to pass signals to the backward count input lead 22 of the reversible counter 20. As explained before, these signals accelerate the action of the reversible counter 20 in reducing its count and placing the apparatus 74 in its steady state condition.

The frequency of the input signal $f_1$ on the terminal 90 and the count of the counter 84 at which a carry signal is delivered may be adjusted in accordance with the particular operating requirements of the apparatus 74 to achieve maximum accuracy and response to changes in the frequency of the input signal on the terminal 12 to be measured.

Refer to Figure 4 which illustrates a frequency meter and counting apparatus 100 which has a modified form of control network 34 but otherwise conforms with the general operation of the apparatus 10 which was described in connection with Figure 1. Keeping in mind the general description of the apparatus 10 already given, the control network 34 of the apparatus 100 will now be described in detail.

The control network 34 of the apparatus 100 includes a counter 102 which counts signals delivered to the input terminal 12 and is reset to its zero count by the occurrence of a signal on the line 30.

The counter 102 delivers a carry output signal after attaining a predetermined count $C_1$. The carry signal from the counter 102 is delivered to a delay flop 104. The delay flop 104 is characterized by delivering an output signal for a predetermined period of time after being energized by a carry signal from the carry counter 102.

The output signal from the delay flop 104 is delivered over a line 106 to condition a forward output gate 108.

The forward output gate 108 receives signals having a predetermined frequency $f_1$ from an input terminal 110. The forward output gate 108 delivers the signals on terminal 110 only during the occurrence of an output signal on line 106 from the delay flop 104. The signals passed by the forward output gate 108 are delivered through the buffer 16 to the forward count input lead 18 of the reversible counter 20 accelerating the rate of increase of its count C.

A counter 112 similar to the counter 102 counts signals occurring on the line 30 and is reset to its zero count by the occurrence of a signal on the line 14 from the terminal 12. The counter 112 delivers an output carry signal upon attaining a predetermined count $C_2$ which may be equal to the carry count $C_1$ of the counter 102.

The carry signal from the counter 112 is delivered to a delay flop 114 similar to the delay flop 104. The output signal from the delay flop 114 is delivered over a line 116 to a backward output gate 118 conditioning it for passage of signals from the terminal 110.

Signals passed by the backward output gate 118 are delivered through the buffer 32 to the backward count input lead 22 of the reversible counter 20 accelerating the rate at which the count C is decreased.

In the operation of the apparatus 100 when it is in an unbalanced condition with the rate of signals delivered to the terminal 12 exceeding the rate of signals on the line 30, the counter 102 will attain the count $C_1$ sufficient to provide a carry output signal before it is reset, if the unbalance condition is of a sufficient degree. The carry signal from the counter 102 triggers the delay flop 104 so that it delivers a gating signal to the gate 108 for a predetermined interval of time or duration. During this predetermined interval of time, the gate 108 passes signals from the terminal 110 to the reversible counter accelerating the rate of increase in its count. By adjusting the duration of the output signal of the delay flop 104 and the frequency $f_1$ delivered to the input terminal 110, the control network 34 delivers a controlled number of signals or pulses to the reversible counter 20. By adjusting the count of the counter 102 at which a carry is delivered, the minimum degree of unbalance required to activate the control network 34 may be determined.

In a similar manner, the counter 112 of the delay flop 114 and the backward output gate 118 operate to cause the delivery of a predetermined number of count signals to the backward input lead 22 of the counter 20 when the degree of unbalance exceeds a minimum value in the other direction with the rate of signals on the line 30 exceeding the rate of signals on the line 14.

Of course, the control network 34 does not affect the count C of the reversible counter 20 when the apparatus 10 is in its equilibrium condition or when it is in a condition of unbalance below the minimum response value of the control network 34. Although the control network 34 of the apparatus 100 is not designed to respond to extremely low values of unbalance, it has a great advantage in its simplicity of operation and the minimum number of components required.

It will, of course, be understood that the description and drawings, herein contained, are illustrative merely, and that various modifications and changes can be made in the structures disclosed without departing from the spirit of the invention.

What is claimed is:

1. A counting apparatus having an input terminal for receiving information signals, a reversible counting device having a forward input lead receiving signals from said input terminal, and a backward input lead receiving feedback signals tending to place said counting device in a steady state condition; means responsive to the count in said counting device for providing said feedback signals, a control network responsive to said information and feedback signals for selectively delivering additional signals to that one of said forward and backward input leads which, when energized by said additional signals, accelerates the action of said counting device tending to place it in its steady state condition, means for applying said information and feedback signals to said control network, and means for coupling said forward and said backward leads to said control network.

2. A counting apparatus comprising an information input terminal; a reversible counting device having a first input lead excited by signals from said input terminal, a second input lead, and an output; a rate multiplier unit controlled by signals applied from the output of said counting device and having an input line for receiving activating signals, and an output line delivering signals for exciting the second input lead of said counting device; and a control network responsive to said signals from said input terminal and said signals from said rate multiplier unit output line delivering additional signals to that one of said first and second input leads which, when energized by said additional signals, accelerates the action of said counting device tending to place it in its steady state condition.

3. A frequency meter apparatus comprising an information input terminal for receiving pulse signals at a frequency ($f$); a forward-backward binary counting device having a forward count input lead excited by signals from said input terminal, a backward count input lead, and a plurality of output leads delivering an output count signal ($C$); a binary rate multiplier unit energized by the output leads of said counting device for controlling the rate of an output product signal and having an input line for receiving pulse signals having a frequency ($f_0$), and an output line delivering said output product signal ($Cf_0$) to the backward count input lead of said counting device so that at the steady state condition of said counting device its count ($C$) corresponds to the ratio ($f/f_0$) of the respective frequencies ($f$ and $f_0$) of the signals received by said input terminal and input line of said multiplier unit; and a control network detecting signals from said input terminal and output line of said multiplier unit and selectively delivering signals to that one of said counting device input leads accelerating action tending to place said apparatus in its steady state condition.

4. A counting apparatus comprising an information input terminal; a reversible counting device having a forward input lead receiving signals from said input terminal, and a backward input lead for receiving feedback signals related to the count of said counting device and tending to place said counting device in a steady state condition; and a control network for detecting said information and feedback signals for determining an unbalanced condition of said counting device; and means responsive to the condition of said counting device for coupling feedback signals to said backward lead and said control network, said control network accelerating the action of said counting device tending to place it in its steady state condition by increasing the count of said counting device when the signals received by the forward input lead from said input terminal exceed the feedback signals received by the backward input lead and decreasing the count of said counting device when the signals received by the backward input lead exceed the signals received by the forward input lead.

5. The counting apparatus of claim 4 in which said control network accelerates the action of said counting device tending to place it in its steady state condition by delivering additional signals to the forward input lead of said counting device for accelerating the increase of its count when the signals received by the forward input lead from said input terminal exceed the feedback signals received by the backward input lead and delivering signals to the backward input lead of said counting device for accelerating the decrease of its count when the feedback signals received by said backward input lead exceed the signals received by the forward input lead from said input terminal.

6. A counting apparatus comprising an information input terminal; a reversible counting device having a forward lead excited by signals from said input terminal, a backward input lead, and an output; a rate multiplier unit controlled by signals from and coupled to the output of said counting device, said rate multiplier unit having an input line for receiving activating signals, and an output line delivering signals for exciting the backward input lead of said counting device; and a control network accelerating the action of said counting device tending to place it in its steady state condition by delivering additional signals to the forward input lead of said counting device for accelerating the increase of its count when the signals received by the forward input lead from the input terminal exceed the signals received by the backward input lead from the output line of said multiplier unit and delivering additional signals to the backward input lead of said counting device for accelerating the decrease of its count when the signals received by the backward input lead from the output line of said multiplier unit exceed the signals received by the forward input lead from said input terminal.

7. A frequency meter apparatus comprising an input terminal for receiving pulse information signals at a frequency ($f$); a forward-backward binary counting device having a forward count input lead excited by signals from said input terminal, a backward count input lead, and a plurality of output leads delivering an output count signal ($C$); a binary rate multiplier unit energized by signals from the output leads of said counting device for controlling the rate of output product pulse signals and having an input line for receiving pulse signals having a frequency ($f_0$) and an output line delivering said output product pulse signals at the product rate ($Cf_0$) to the backward count input lead of said counting device, so that at steady state condition of said counting device its count ($C$) corresponds to the ratio ($f/f_0$) of the respective frequencies ($f$ and $f_0$) of the signals received by said input terminal and the input line of said multiplier unit; a control network, and means for coupling said pulse signals at said product rate ($Cf_0$) and said pulse information signals to said control network, said control network being responsive to an unbalanced condition of said counting device for accelerating the action of said counting device tending to place it in its steady state condition by delivering additional pulse signals to the forward count input lead of said counting device for accelerating the increase of its count when the frequency of the pulse signals received by the forward count input lead from said input terminal exceeds the frequency of the pulse signals received by the backward count input lead from said multiplier unit and delivering additional pulse signals to the backward count input lead of said counting device for accelerating the decrease of its count when the frequency of the pulse signals received by the backward count input lead from said multiplier unit exceeds the frequency of pulse signals received by the forward count input lead from said input terminal.

8. A counting apparatus having an input terminal for receiving forward count signals, a feedback loop responsive to the count in said counting apparatus and delivering backward count signals tending to place said apparatus in a steady state condition; and a control network energized by said forward and said backward count signals and coupled to said counting apparatus, said control network being actuated by the occurrence of more than one forward count signal before the occurrence of a backward count signal to increase the count of said apparatus and actuated by the occurrence of more than one backward count signal before the occurrence of a forward count signal to decrease the count of said apparatus; thereby accelerating the action of said counting apparatus tending to place it in its steady state condition.

9. A counting apparatus having an input terminal for receiving forward count signals, a feedback loop responsive to the count in said counting apparatus for delivering backward count signals thereto tending to place said apparatus in a steady state condition; a bistable circuit having a first state assumed in response to the occurrence of a forward count signal and a second state assumed after the occurrence of a backward count signal; a first gate conditioned to deliver forward count signals in response to said bistable circuit being in its first state; a second gate conditioned to deliver backward count signals in response to said bistable circuit being in its second state; a control counter counting signals delivered thereto by said first and second gates, a source of accelerating signals, means responsive to the count in said control counter for controlling the rate of said accelerating signals; said bistable circuit upon switching from one to the other of its states delivering a reset signal to said counter returning the count stored therein to zero; a third gate delivering said accelerating signals to said counting apparatus as forward count signals in response to said bistable circuit being in its first state; and a fourth gate delivering said accelerating signals to said counting apparatus as backward count signals in response to said bistable circuit being in its second state; the signals from said third gate increasing the count of said apparatus while the signals from said fourth gate decrease its count for accelerating the action of said counting apparatus tending to place it in its steady state condition.

10. A frequency meter apparatus comprising an information input terminal for receiving input pulse signals at a frequency ($f$); a forward-backward binary counting device having a forward count input lead excited by signals from said input terminal, a backward count input lead, and a plurality of output leads delivering an output count signal ($C$); a first binary rate multiplier unit energized by signals from the output leads of said counting device for controlling its rate and having an input line for receiving pulse signals having a frequency ($f_0$), and an output line delivering the product pulse signals ($Cf_0$) to the backward count input lead of said counting device, so that at steady state condition of said counting device its count is proportional to the ratio ($f/f_0$) of the respective frequencies ($f$ and $f_0$) of the signals received by the input terminal and the input line of said first multiplier unit; a bistable circuit assuming a first state assumed after the occurrence of an input pulse signal and a second state in response to the occurrence of a product pulse signal; a first gate conditioned to deliver forward count signals to said forward count input lead in response to said bistable circuit being in its first state; a second gate conditioned to deliver backward count signals to said backward count input lead in response to said bistable circuit being in its second state; a control counter counting signals delivered thereto by said first and second gates producing an output count signal ($C_1$); and being reset to zero by said bistable circuit when the latter circuit switches from one to the other of its states; a second rate multiplier unit providing product pulse signals having a rate ($C_1f_1$) controlled by the count of said control counter, an input line receiving pulse signals having a frequency ($f_1$), and an output line delivering said product pulse signals $C_1f_1$); a third gate delivering the product pulse signals from said second multiplier unit to the forward count input lead of said binary counting device in response to said bistable circuit being in its first state; and a fourth gate delivering the product pulse signals from said second multiplier unit to the backward count input lead of said counting device in response to said bistable circuit being in its second state.

11. A counting apparatus having an input terminal for receiving forward count signals, a feedback loop responsive to the count in said counting apparatus for delivering backward count signals thereto tending to place said apparatus in a steady state condition; a control network actuated by the occurrence of a predetermined number of forward count signals before the occurrence of a backward count signal to deliver additional forward count signals to said apparatus increasing the count of said apparatus until the occurrence of a backward count signal, and actuated by the occurrence of a predetermined number of backward count signals before the occurrence of a forward count signal to deliver additional backward count signals to said apparatus decreasing the count of said apparatus until the occurrence of a forward count signal; said control network accelerating the action of said counting apparatus tending to place it in its steady state condition.

12. A counting apparatus having an input terminal for receiving forward count signals, a feedback loop responsive to the count in said counting apparatus for delivering backward count signals thereto tending to place said apparatus in a steady state condition; a first bistable circuit having a first state assumed in response to the occurrence of a forward count signal and a second state assumed in response to the occurrence of a backward count signal; a first gate conditioned to deliver forward count signals in response to said bistable circuit being in its first state; a second gate conditioned to deliver backward count signals in response to said bistable circuit being in its second state; a control counter counting said forward and backward count signals delivered thereto by said first and second gates, and delivering an output signal after attaining a predetermined count and being reset to zero by a reset signal from said first bistable circuit when said circuit switches from one to the other of its states; a second bistable circuit being set to its first state in response to an output signal from said control counter and being set to its second state in response to said reset signal from said first bistable circuit; and means responsive to said second bistable circuit being in its first state for controlling the delivery of count signals increasing the additional count of said apparatus when said first bistable circuit is in its first state and decreasing the count of said apparatus when said first bistable circuit is in its second state for accelerating the action of said counting apparatus tending to place it in its steady state condition.

13. A frequency meter apparatus comprising an information input terminal for receiving input pulse signals at a frequency ($f$); a forward-backward binary counting device having a forward count input lead excited by signals from said input terminal, a backward count input lead, and a plurality of output leads delivery an output count signal ($C$); a binary rate multiplier unit energized by signals from the output leads of said counting device for controlling its rate and having an input line for receiving pulse signals having a frequency ($f_0$), and an output line delivering the product pulse signals ($Cf_0$) to the backward count input lead of said counting device, so that at steady state condition said counting device count is proportional to the ratio ($f/f_0$) of the respective frequencies ($f$ and $f_0$) of the signals received by the input terminal and the input line of said multiplier unit; a first bistable circuit having a first state assumed in response to the occurrence of an input pulse signal and a second state assumed in response to the occurrence of a product pulse signal; a first gate conditioned to deliver said input pulse signals in response to said bistable circuit being in its first state; a second gate conditioned to deliver said product pulse signals in response to said bistable circuit being in its second state; a control counter counting said signals delivered by said first and second gates, and delivering an output pulse signal after a predetermined count and being reset to zero in response to a reset signal from said first bistable circuit when said circuit switches from one to the other of its states; a second bistable circuit being set to its first state by an output pulse signal from said control counter and being set to its second state in response to said control counter being reset; a third gate conditioned for delivering pulse signals having a frequency ($f_1$) to the forward count input lead of said binary counting device in response to said first and second bistable circuits being in their first states; and a fourth gate conditioned for delivering pulse signals having a frequency ($f_1$) to the backward count input lead of said counting device in response to said first and second bistable circuits respectively being in their second and first states; the pulse signals delivered by said third and fourth gates accelerating the action of said counting device tending to place it in its steady state condition.

14. A counting apparatus having an input terminal for receiving forward count signals, a feedback loop responsive to the count in said counting apparatus delivering backward count signals thereto tending to place said apparatus in a steady state condition; a control network actuated by the occurrence of a predetermined number of forward count signals before the occurrence of a backward count signal to increase the count of said apparatus by a substantially predetermined amount and actuated by the occurrence of a predetermined number of backward count signals before the occurrence of a forward count signal to decrease the count of said apparatus by a substantially predetermined amount; said control network accelerating the action of said counting apparatus tending to place it in its steady state condition.

15. A counting apparatus having an input terminal for receiving forward count signals, a feedback loop responsive to the count in said counting apparatus for delivering backward count signals thereto tending to place said apparatus in a steady state condition; a first control counter counting said forward count signals, being reset to zero in response to the occurrence of a backward count signal, and delivering an output signal after attaining a predetermined count; a second control counter counting said backward count signals, being reset to zero in response to the occurrence of a forward count signal, and delivering an output signal after attaining a predetermined count; a first control circuit delivering a predetermined number of signals to said counting apparatus to increase the count of said apparatus in response to said output signal from said first control counter; and a second control circuit delivering a predetermined number of signals to said counting apparatus to decrease the count of said counting apparatus in response to said output signal from said second control circuit; the signals delivered by said first and second control circuits accelerating the action of said counting apparatus tending to place it in its steady state condition.

16. A frequency meter apparatus comprising an information input terminal for receiving input pulse signals at a frequency ($f$); a forward-backward binary counting device having a forward count input lead excited by signals from said input terminal, a backward count input lead, and a plurality of output leads delivering an output count signal (C); a binary rate multiplier unit energized by signals from the output leads of said counting device for controlling its rate and having an input line for receiving pulse signals having a frequency ($f_0$), and an output line delivering the product pulse signals ($Cf_0$) to the backward count input lead of said counting device, so that at steady state condition of said counting device its count is proportional to the ratio ($f/f_0$) of the respective frequencies ($f$ and $f_0$) of the signals received by the input terminal and the input line of said multiplier unit; a first control counter counting said input pulse signals, being reset to zero in response to the occurrence of a product pulse signal, and delivering an output pulse signal after attaining a predetermined count; a second control counter counting said product pulse signals, being reset to zero in response to the occurrence of an input pulse signal, and delivering an output pulse signal after attaining a predetermined count; a first delay flop circuit responding to said second control counter output signal by producing an output signal for a predetermined period after the delivery of an output signal by the first control counter; a second delay flop circuit producing an output signal for a predetermined period after the delivery of said output signal by the second control counter; a first gate conditioned for delivering pulse signals having a frequency ($f_1$) to the forward count input lead of said counting device by said first delay flop circuit output signal; and a second gate conditioned for delivering pulse signals having a frequency ($f_1$) to the backward count input lead of said counting device by said second delay flop circuit output signal; the pulse signals delivered by said gates accelerating the action of said counting device tending to place it in its steady state condition.

17. A counting apparatus having an input terminal for receiving information signals, a source of feedback signals to alter the count stored therein having a frequency higher than any of said information signals, means responsive to said count stored in said counting apparatus for selectively delivering a fraction of said feedback signals to said counting apparatus to alter its state, and means responsive to the frequency difference between said information signals and said fraction of said feedback signals for providing additional signals to said counting apparatus for reducing said frequency difference.

18. Apparatus for providing an output indication of the ratio between first and second input signal rates comprising, a counter, means responsive to the count in said counter for decreasing the rate of said second input signal to derive a feedback signal, means for coupling said first input signal and said feedback signal to said counter to change the count therein in respective opposite directions, and control means responsive to the difference between said feedback signal rate and said first input signal rate for providing additional signals to said counter for altering the count therein in a direction whereby said difference is reduced.

References Cited in the file of this patent

UNITED STATES PATENTS

| | | |
|---|---|---|
| 2,537,427 | Seid | Jan. 5, 1951 |
| 2,568,724 | Earp | Sept. 25, 1951 |
| 2,584,866 | Gray | Feb. 5, 1952 |
| 2,717,994 | Dickinson | Sept. 13, 1955 |
| 2,796,598 | Cartwright | June 18, 1957 |

OTHER REFERENCES

"An Operational Digital Feedback Divider," article in Transactions of the I.R.E., March 1954, pages 17–20.